United States Patent
Ishikawa et al.

(10) Patent No.: US 11,645,916 B2
(45) Date of Patent: May 9, 2023

(54) MOVING BODY BEHAVIOR PREDICTION DEVICE AND MOVING BODY BEHAVIOR PREDICTION METHOD

(71) Applicant: HITACHI AUTOMOTIVE SYSTEMS, LTD., Hitachinaka (JP)

(72) Inventors: Masayoshi Ishikawa, Tokyo (JP); Hiroaki Ito, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 473 days.

(21) Appl. No.: 16/768,733

(22) PCT Filed: Nov. 28, 2018

(86) PCT No.: PCT/JP2018/043689
§ 371 (c)(1),
(2) Date: Jun. 1, 2020

(87) PCT Pub. No.: WO2019/124001
PCT Pub. Date: Jun. 27, 2019

(65) Prior Publication Data
US 2021/0171025 A1 Jun. 10, 2021

(30) Foreign Application Priority Data
Dec. 18, 2017 (JP) .............................. JP2017-242023

(51) Int. Cl.
*B60W 30/095* (2012.01)
*B60W 50/00* (2006.01)
(Continued)

(52) U.S. Cl.
CPC .......... *G08G 1/166* (2013.01); *B60W 30/0956* (2013.01); *B60W 50/0097* (2013.01);
(Continued)

(58) Field of Classification Search
CPC .......... B60W 30/0956; B60W 50/0097; G06N 3/0454; G06N 3/08
See application file for complete search history.

(56) References Cited

U.S. PATENT DOCUMENTS

2006/0155664 A1    7/2006  Morikawa
2015/0353081 A1   12/2015  Kaminade et al.
(Continued)

FOREIGN PATENT DOCUMENTS

CN       105321375 A     2/2016
JP       2010-173616 A   8/2010
(Continued)

OTHER PUBLICATIONS

Office Action issued in corresponding Japanese Patent Application No. 2017-242023 dated May 18, 2021, with partial English translation.
(Continued)

*Primary Examiner* — Anshul Sood
(74) *Attorney, Agent, or Firm* — Foley & Lardner LLP

(57) ABSTRACT

The present invention improves the accuracy of predicting rarely occurring behavior of moving bodies, without reducing the accuracy of predicting commonly occurring behavior of moving bodies. A vehicle 101 is provided with a moving body behavior prediction device 10. The moving body behavior prediction device 10 is provided with a first behavior prediction unit 203 and a second behavior prediction unit 207. The first behavior prediction unit 203 learns first predicted behavior 204 so as to minimize the error between behavior prediction results for moving bodies and behavior recognition results for the moving bodies after a prediction time has elapsed. The second behavior prediction unit 207 learns future second predicted behavior 208 of the moving
(Continued)

bodies around the vehicle 101 so that the vehicle 101 does not drive in an unsafe manner.

12 Claims, 10 Drawing Sheets

(51) Int. Cl.

| | | |
|---|---|---|
| *G06N 3/045* | (2023.01) | |
| *G08G 1/16* | (2006.01) | |
| *G06T 7/285* | (2017.01) | |
| *G06T 7/70* | (2017.01) | |
| *G06N 3/08* | (2023.01) | |
| *G06T 11/00* | (2006.01) | |
| *G06V 20/58* | (2022.01) | |
| *G06V 10/764* | (2022.01) | |
| *G06V 10/82* | (2022.01) | |
| *B60K 35/00* | (2006.01) | |

(52) U.S. Cl.
CPC .............. *G06N 3/045* (2023.01); *G06N 3/08* (2013.01); *G06T 7/285* (2017.01); *G06T 7/70* (2017.01); *G06T 11/00* (2013.01); *G06V 10/764* (2022.01); *G06V 10/82* (2022.01); *G06V 20/58* (2022.01); *B60K 35/00* (2013.01); *B60W 2420/42* (2013.01); *B60W 2554/4029* (2020.02); *B60W 2554/4041* (2020.02); *B60W 2554/4042* (2020.02); *B60W 2554/4043* (2020.02); *G06T 2207/30241* (2013.01); *G06T 2207/30261* (2013.01)

(56) References Cited

U.S. PATENT DOCUMENTS

| | | | |
|---|---|---|---|
| 2017/0270374 A1 | 9/2017 | Myers et al. | |
| 2018/0089563 A1* | 3/2018 | Redding | ................ G06N 3/006 |
| 2018/0374341 A1* | 12/2018 | Branson | ............ B60W 60/0015 |

FOREIGN PATENT DOCUMENTS

| | | |
|---|---|---|
| JP | 2011-014037 A | 1/2011 |
| JP | 2013-196601 A | 9/2013 |
| JP | 2017-211913 A | 11/2017 |
| WO | WO-2004/068399 A1 | 8/2004 |

OTHER PUBLICATIONS

Koike et al., "A Driver Model Based on Reinforcement Learning with Multiple-Step State Estimation", (Electronics & Communications in Japan, Part III—FundamentalElectronic Science) The Transactions of The Institute of Electronics Information and Communication Engineers D-II, J84-D-II, 2001, pp. 370-379.

Orita et al., "A Driver Model based on Reinforcement Learning Switching Multiple Controllers", IEICE Technical Report, vol. 102, No. 508, 2002, pp. 71-76.

Wang et al., "Formulation of Deep Reinforcement Learning Architecture Toward Autonomous Driving for On-Ramp Merge", IEEE Conference Proceedings, vol. 2017, No. ITSC, 2017, pp. 1-6.

International Search Report with English translation and Written Opinion issued in corresponding application No. PCT/JP2018/043689 dated Apr. 9, 2019.

* cited by examiner

MOVING BODY BEHAVIOR PREDICTION DEVICE AND MOVING BODY BEHAVIOR PREDICTION METHOD

TECHNICAL FIELD

The present invention relates to a moving body behavior prediction device and a moving body behavior prediction method which can be applied to automatic driving of an automobile or the like.

BACKGROUND ART

To realize automatic driving of automobiles, sensing technology that senses surrounding conditions using in-vehicle cameras, etc., recognition technology that recognizes the state of the vehicle and the surrounding environment based on the sensed data, and control technology for controlling a driving speed and a steering angle based on the recognition information of the state of the vehicle and the surrounding environment are being developed. In the recognition technology, a prediction technology that recognizes an object or a moving body existing around the own vehicle and accurately predicts their future position is required.

Various factors such as the interaction between the moving bodies and the surrounding environment affect the future behavior of the moving bodies such as pedestrians and vehicles. Since it is difficult to formulate all of these effects, the effects of each factor may be treated as a black box by machine learning.

For example, PTL 1 discusses a mechanism for predicting a future position of the moving body by regression analysis. Generally, supervised learning is used for the prediction problem.

CITATION LIST

Patent Literature

PTL 1: JP 2013-196601 A

SUMMARY OF INVENTION

Technical Problem

However, the predictor obtained by supervised learning is strong for a frequent pattern, but has poor prediction accuracy for a rare pattern. On the other hand, in the case of automatic driving, it is necessary to consider rarely occurring actions such as jumping out of a pedestrian, sudden acceleration/deceleration of another vehicle, and lane change, for safety. For this reason, it is difficult to realize safe driving by automatic driving with the prediction technique based on simple supervised learning.

In addition, in supervised learning, if only rare pattern data such as jumping out, sudden acceleration/deceleration, lane change, etc. is used for learning, only rare pattern prediction is performed, which hinders normal safe driving.

The invention has been made in view of the above circumstances, and an object of the invention is to provide a moving body behavior prediction device and a moving body behavior prediction method which can improve the accuracy of predicting a rare behavior of the moving body without reducing the accuracy of predicting the behavior of the moving body that frequently occurs.

Solution to Problem

In order to achieve the above object, the moving body behavior prediction device according to a first aspect includes a first behavior prediction unit that outputs a first prediction behavior of a moving body based on a prediction result of a behavior of the moving body recognizable from a vehicle and a recognition result of a behavior of the moving body after a prediction time elapses, and a second behavior prediction unit that outputs a second prediction behavior of the moving body recognizable from the vehicle based on the behavior of the vehicle.

Advantageous Effects of Invention

According to the invention, it is possible to improve the accuracy of predicting rarely occurring behavior of moving bodies without reducing the accuracy of predicting commonly occurring behavior of moving bodies.

DESCRIPTION OF EMBODIMENTS

Embodiments will be described with reference to the drawings. Further, the embodiments described below do not limit the scope of the invention. Not all the elements and combinations thereof described in the embodiments are essential to the solution of the invention.

First Embodiment

Figure 1:
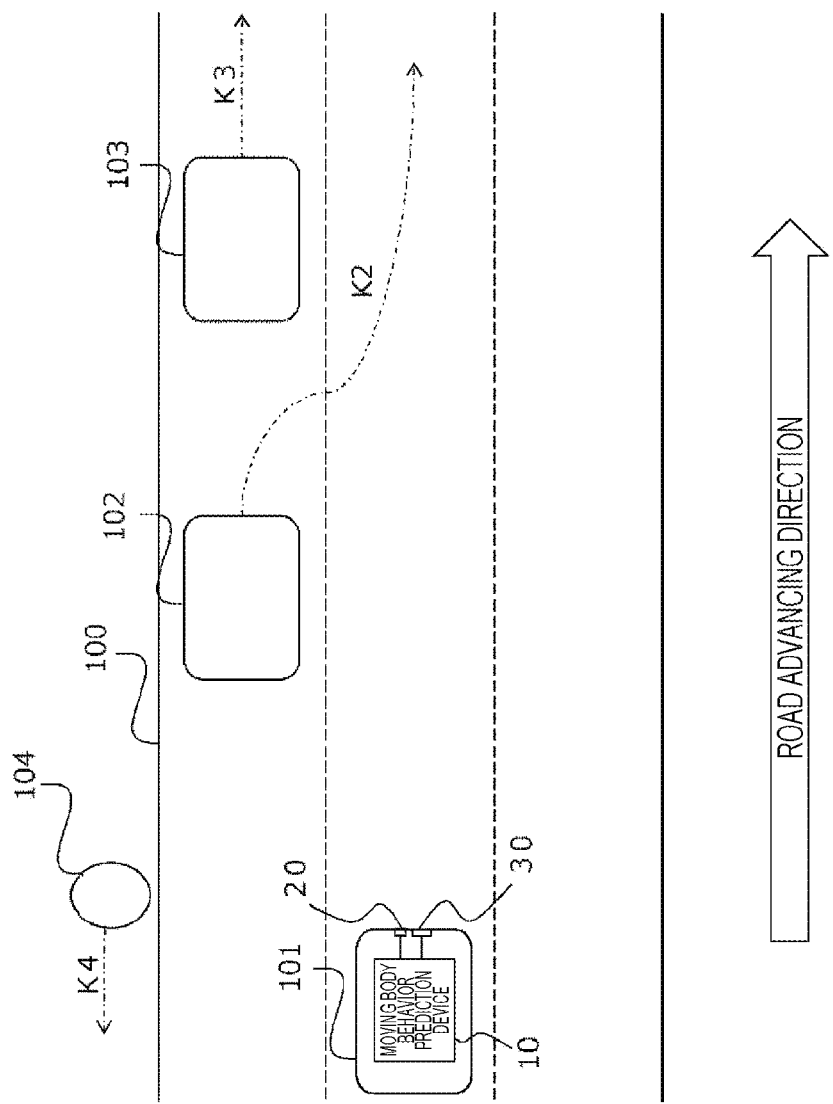
FIG. 1 is a schematic diagram illustrating an example of a driving environment of an automobile to which a moving body behavior prediction device according to a first embodiment is applied.

FIG. 1 is a schematic diagram illustrating an example of a driving environment of an automobile to which a moving body behavior prediction device according to the first embodiment is applied.

In FIG. 1, it is assumed that an own vehicle 101 is driving on a road 100, and other vehicles 102 and 103 are driving in front of the own vehicle 101. The other vehicles 102 and 103 are vehicles other than the own vehicle 101. It is assumed that a pedestrian 104 is walking beside the road 100.

The own vehicle 101 is provided with a moving body behavior prediction device 10, a sensor 20, and a display unit 30. The moving body behavior prediction device 10 predicts a future position of a moving body such as the other vehicles 102 and 103, the pedestrian 104, and the motorcycle (hereinafter, may be referred to as predicted behavior). The sensor 20 detects a state of the road 100 and the moving body around the own vehicle 101. As the sensor 20, for example, a camera, a radar, a rider, a sonar, a GPS (Global Positioning System), and a car navigation can be used. The display unit 30 displays the predicted behavior predicted by the moving body behavior prediction device 10. This predicted behavior may be displayed so as to be superimposed on the image in front of the own vehicle 101 acquired by the sensor 20, or may be displayed on the windshield of the own vehicle 101.

For example, when the other vehicles 102 and 103 and the pedestrian 104 move along routes K2 to K4, respectively, the moving body behavior prediction device 10 can predict the position where the other vehicles 102 and 103 and the pedestrian 104 is likely to be. The own vehicle 101, in automatic driving, can control a steering angle and a speed to prevent collision with the moving body such as the other vehicles 102 and 103 and the pedestrian 104, sudden steering, sudden deceleration, sudden acceleration, and sudden stop of the own vehicle 101, based on the prediction of the behavior of the moving body by the moving body behavior prediction device 10.

The behavior of the moving body such as the other vehicles 102 and 103, the pedestrian 104, or a two-wheeled vehicle changes according to the surrounding environment. For example, the driving behavior of the vehicle changes in a highway, a national road, and a back road. In addition, the behavior of the moving body also changes depending on how many other moving bodies exist in the vicinity. For example, the behavior of the vehicle greatly changes on an expressway where no other moving bodies exist, a congested expressway, a shopping street with many people, and the like. Therefore, for safe automatic driving, it is required to predict the future behavior of the moving body in consideration of driving road information, interaction with surrounding objects, and the like.

The behavior of the vehicle or the moving body includes a frequent pattern that frequently occurs and a rare pattern that rarely occurs. The frequent pattern includes normal driving of the other vehicles 102 and 103 along the road 100 and walking of the pedestrian 104 along the road 100. The rare pattern includes jumping of the pedestrian 104 out onto the road 100, crossing the road 100, sudden acceleration/deceleration of the other vehicles 102 and 103, changing course, and the like.

Here, in order to be able to cope with both the frequent pattern and the rare pattern, the moving body behavior prediction device 10 outputs a first prediction behavior of the moving body based on a prediction result of the behavior of the moving body around the own vehicle 101 and a recognition result of the behavior of the moving body after the elapse of a prediction time. Further, the moving body behavior prediction device 10 outputs a second prediction behavior of the moving body recognizable from the own vehicle 101 based on the behavior of the own vehicle 101. The first prediction behavior can be predicted from the frequent pattern. The second prediction behavior can be predicted from the rare pattern.

At this time, it is difficult to formulate all factors that affect the future behavior of the moving body, such as driving road information and interaction with surrounding objects. For this reason, by treating the influence of each factor as a black box by machine learning, it is possible to predict the future behavior of the moving body in consideration of driving road information, interaction with surrounding objects, and the like.

The frequent pattern is predicted by supervised learning. Here, the future position and the future speed of the object recognized by the sensor 20 attached to the own vehicle 101 are predicted, and are used as the first prediction behavior. Thereafter, learning is performed so that the difference between the position and speed of the same object observed after the elapse of a predetermined prediction time and the predicted future position and future speed becomes small.

The rare pattern is predicted by reinforcement learning, and the predicted future position and predicted future speed are used as the second prediction behavior. Here, based on the first prediction behavior by supervised learning and the second prediction behavior by reinforcement learning, it is determined whether the own vehicle 101 can be safely driven when controlling the own vehicle 101. The second predicted behavior is modified by reinforcement learning to make the driving more safely.

In the behavior prediction based on supervised learning, it is necessary to perform accurate behavior prediction for more data, so that the prediction accuracy for the frequent pattern is easily improved.

In the behavior prediction based on the reinforcement learning, it is necessary to focus on factors that make the control of the own vehicle 101 unsafe, so that the prediction accuracy for the rare pattern that is a dangerous behavior can be easily improved.

As described above, in the above-described embodiment, by combining supervised learning and reinforcement learning, it is possible to predict the behavior of the moving body in which both the frequent pattern and the rare pattern are reflected, and control the own vehicle more safely.

Hereinafter, the moving body behavior prediction device according to the embodiment will be described in detail.

Figure 2:
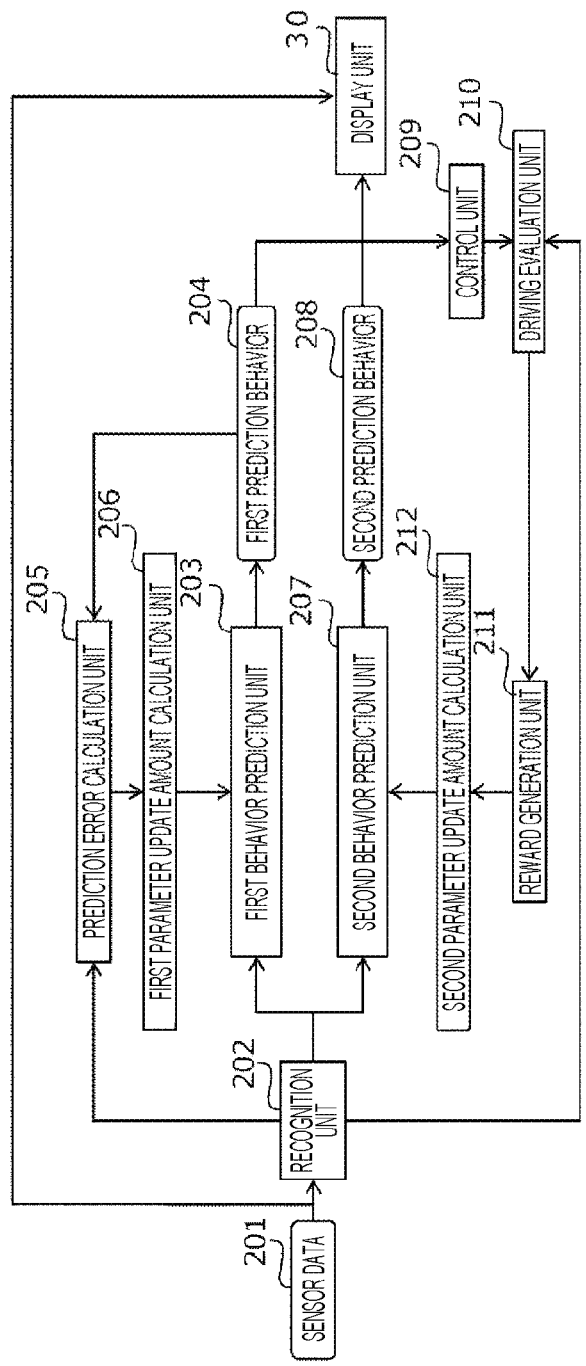
FIG. 2 is a block diagram illustrating a configuration of the moving body behavior prediction device according to the first embodiment.

FIG. 2 is a block diagram illustrating a configuration of the moving body behavior prediction device according to the first embodiment. In FIG. 2, the moving body behavior prediction device 10 includes a recognition unit 202, a first behavior prediction unit 203, a prediction error calculation unit 205, a first parameter update amount calculation unit 206, a second behavior prediction unit 207, a control unit 209, a driving evaluation unit 210, a reward generation unit 211, and a second parameter update amount calculation unit 212.

Here, the first behavior prediction unit 203 can learn a first prediction behavior 204 so as to minimize an error between the prediction result of the behavior of the moving body and the recognition result of the behavior of the moving body after the elapse of the prediction time. The second behavior prediction unit 207 can learn a future second prediction behavior 208 of the moving body around the own vehicle 101 so that the own vehicle 101 does not perform unsafe driving.

At this time, the first behavior prediction unit 203 and the second behavior prediction unit 207 output the first prediction behavior 204 and the second prediction behavior 208, respectively, by using the result recognized by the recognition unit 202.

In addition, when the first prediction behavior 204 is the frequent pattern, the first behavior prediction unit 203 learns the first prediction behavior 204 by supervised learning so that the own vehicle 101 can run safely. When the second prediction behavior 208 is the rare pattern, the second behavior prediction unit 207 learns the second prediction behavior 208 by reinforcement learning so that the own vehicle 101 can travel safely. In addition, the second prediction behavior 208 can take the same form as the first prediction behavior 204. At this time, the configuration of the second behavior prediction unit 207 can be the same as the configuration of the first behavior prediction unit 203. In addition, the second behavior prediction unit 207 may share parameters with the first behavior prediction unit 203.

Sensor data 201 is data obtained from the sensor 20 attached to the own vehicle 101. The recognition unit 202 recognizes other nearby vehicles and pedestrians obtained as a result of processing the sensor data 201, and retains map data, road attribute information, destination information, and the like. In addition, it also recognizes information required for the behavior prediction by the prediction model.

Figure 3:
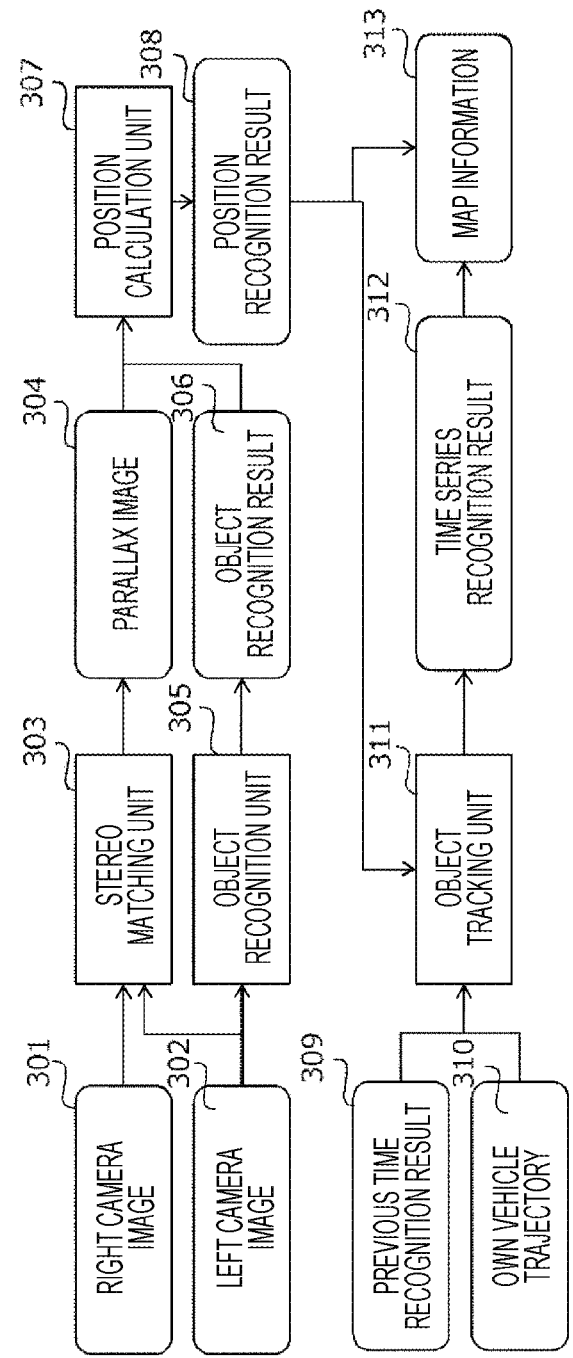
FIG. 3 is a block diagram illustrating a configuration of a recognition unit in FIG. 2.

FIG. 3 is a block diagram illustrating a configuration of the recognition unit in FIG. 2.

In FIG. 3, a recognition unit 202 recognizes a surrounding object and a surrounding environment of the own vehicle 101 based on the sensor data 201. At this time, the sensor data 201 can contain a stereo camera image and time series data obtained from the speed, the yaw rate, the GPS, and the like of the vehicle amount. The recognition unit 202 includes a stereo matching unit 303, an object recognition unit 305, a position calculation unit 307, and an object tracking unit 311.

The stereo matching unit 303 generates a parallax image 304 based on the right camera image 301 and the left camera image 302. Stereo matching can be performed by a convolutional neural network (CNN), a block matching method, or the like.

The object recognition unit 305 performs image processing on the left camera image 302 and generates the object recognition result 306 by recognizing an object appearing on the image. Further, although the example of performing the object recognition processing on the left camera image 302 is illustrated in the configuration of FIG. 3, the object recognition processing may be performed on the right camera image 301. Here, the object recognition processing by the object recognition unit 305 is a moving body detection and semantic segmentation.

The moving body detection can be performed using a Faster R-CNN or a CNN technique called Single Shot multibox Detector (SSD). These are methods for recognizing the position and type of a recognition target on an image. As for the position of the recognition target, a rectangular area including the recognition target on the image is output. In addition, as for the type of the recognition target, a class of the recognition target such as a person or a vehicle included in the rectangular area is output for each of the recognized rectangular areas. As for the rectangular area, a plurality of areas can be extracted from one image. In addition, Faster R-CNN and SSD are examples of the moving body detection, and may be replaced with another method capable of detecting an object on the image. In addition, instead of the object detection method, a method called instance segmentation for recognizing a pixel region in which each recognition target is reflected for each recognition target on an image may be used. For the instance segmentation, a method such as Mask R-CNN is used, but an instance segmentation method other than Mask R-CNN may be used.

Semantic segmentation can be performed using a CNN technique called ResNet or U-Net. Semantic segmentation is a technique for recognizing which class of object each pixel on an image represents. The class recognized by the semantic segmentation can include not only moving bodies such as people and vehicles, but also terrain information such as roadways, pavements, white lines, and buildings, obstacles, and three-dimensional objects. In addition, ResNet and U-Net are examples of semantic segmentation.

The position calculation unit 307 obtains the class information of the object recognition result 306 based on the parallax image 304 and the object recognition result 306, and outputs the information as a position recognition result 308. The position recognition result 308 includes three-dimensional position information of a person or a vehicle recognized by moving body detection and three-dimensional position information of the object recognition result 306 obtained by semantic segmentation.

The object tracking unit 311 performs time series processing of the position recognition result 308 based on the position recognition result 308, the previous time recognition result 309, and an own vehicle trajectory 310, and outputs a time series recognition result 312. The previous time recognition result 309 is the position recognition result 308 up to the previous time. The object tracking unit 311 uses the previous time recognition result 309 and the own vehicle trajectory 310 to predict the position of the object recognized up to the previous time at the current time. Thereafter, matching is performed between the position recognition result 308 at the current time and the predicted position obtained by the position prediction. In this matching, the distance between the position recognition result 308 and each predicted position is calculated, and a combination that minimizes the total distance can be searched. Here, the calculation of the distance may use the closeness of the region on the image, or may use the distance in a three-dimensional space.

Then, the same ID as the previous time is given to the matched object, and a new ID is given to the unmatched object. If there is an object matched at the previous time, the speed of the object is calculated from the position information at the previous time and the current time. The above-described processing is performed on each object recognized by the moving body detection by the object recognition unit 305, and the class, position, speed, and ID of each object are set as a time series recognition result 312.

The map information 313 is information obtained by converting the class information of each pixel obtained by the semantic segmentation in the position recognition result 308 by using the parallax image 304 and forming an overhead image around the own vehicle. In addition, the map information 313 also includes information included in the time series recognition result 312 in the form illustrated in FIG. 4.

Figure 4:
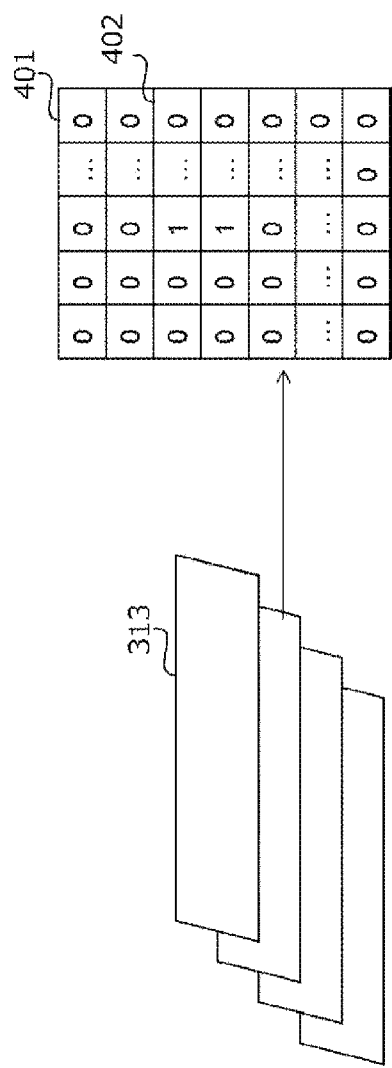
FIG. 4 is a diagram illustrating a configuration example of map information in FIG. 3.

FIG. 4 is a diagram illustrating a configuration example of the map information in FIG. 3.

In FIG. 4, the map information 313 has a plurality of pieces of layer information 401. The layer information 401 is obtained by organizing information around the vehicle for each position information. The layer information 401 is information obtained by cutting out an area around the vehicle and dividing the area by a grid. The information of each cell 402 partitioned by the grid corresponds to the actual position information. For example, in the case of information expressed in one-dimensional binary such as road information, 1 is stored in a cell corresponding to position information of the road, and 0 is stored in a cell corresponding to position information other than the road.

In addition, in the case of information expressed as a two-dimensional continuous value such as speed information, a first direction speed component and a second direction speed component are stored in the layer information over two layers. Here, the first direction and the second direction can represent, for example, the driving direction of the vehicle, the lateral direction, the north direction, the east direction, and the like. In addition, in a case where the speed information is converted into the layer information, the information is stored in the cell 402 corresponding to the position information where the own vehicle 101 or the moving body exists.

As described above, the layer information 401 is information stored in the cell 402 corresponding to the position information of the acquired information over a layer whose dimension is equal to or smaller than the acquired information of the recognition unit 202 with respect to the environment information, the moving body information, and the own vehicle information. In addition, in a case where the acquired information relates to information existing only at a specific position, such as a falling object or a moving body, the information is stored in the cell 402 of the corresponding position information. The map information 313 has a structure in which various layer information 401 in which information around the vehicle is organized for each position information is stacked. When stacking the layer information 401, the position information of the cell 402 of each layer is matched.

Further, in the above-described embodiment, the configuration in which the map information 313 is generated based on the stereo camera image has been described. However, if the map information 313 of the three-dimensional position, speed, and surroundings of the object can be obtained, for example, the object detection in the camera image and the three-dimensional position recognition by the rider may be combined, or a configuration using other sonars or a configuration including only a monocular camera may be used. In addition, map information may be used. In addition, the processing performed by the stereo matching unit 303, the object recognition unit 305, and the object tracking unit 311 may be replaced with another alternative method.

Figure 5:
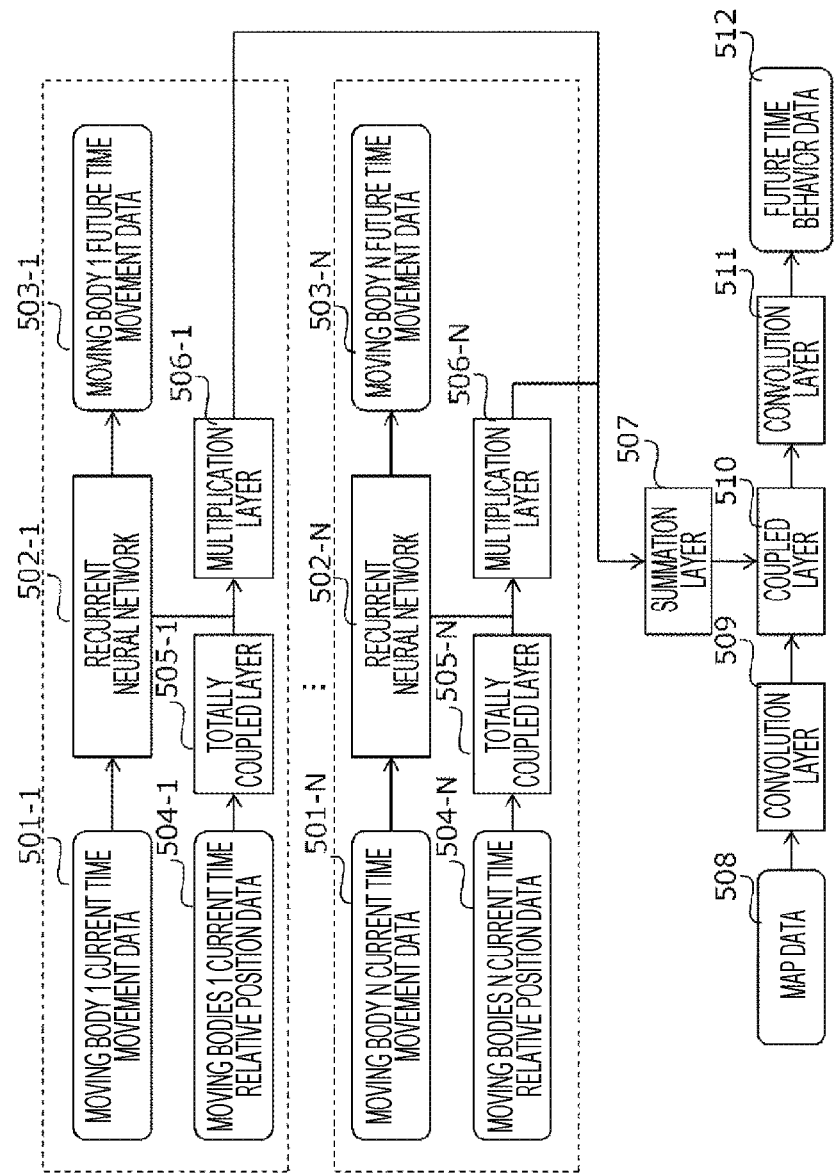
FIG. 5 is a block diagram illustrating a configuration of a behavior prediction unit used in the moving body behavior prediction device according to the first embodiment.

FIG. 5 is a block diagram illustrating a configuration of a behavior prediction unit used in the moving body behavior prediction device according to the first embodiment. This behavior prediction unit can be applied to the first behavior prediction unit 203 or the second behavior prediction unit 207 in FIG. 2.

In FIG. 5, the behavior prediction unit includes recurrent neural networks 502-1 to 502-N, totally coupled layers 505-1 to 505-N, and multiplications layers 506-1 to 506-N are provided for each of N (N is a positive integer) moving bodies 1 to N. Further, in the behavior prediction unit, a summation layer 507, convolution layers 509 and 511, and a coupled layer 510 are provided in common for the N moving bodies 1 to N.

The behavior prediction unit performs position prediction using the recurrent neural networks 502-1 to 502-N for each of the moving bodies 1 to N around the own vehicle 101. The moving bodies 1 to N are N objects recognized by the object recognition unit 305 of the recognition unit 202. In the example of FIG. 1, the moving bodies 1 to N are other vehicles 102 and 103 and the pedestrian 104. Then, the convolutional neural network predicts the behavior considering that the intermediate states of the recurrent neural networks 502-1 to 502-N of the moving bodies 1 to N are aggregated, the road conditions and traffic conditions around the own vehicle 101 are combined, and an interaction between the moving bodies 1 to N and the road information are interacted.

The recurrent neural networks 502-1 to 502-N may be ordinary recurrent neural networks or derivative systems of recurrent neural networks such as Gated Recurrent Unit (GRU) and Long-Short Term Memory (LSTM).

Each of the recurrent neural networks 502-1 to 502-N receives the moving body 1 to N current time movement data 501-1 to 501-N and outputs the moving body 1 to N future time movement data 503-1 to 503-N. The moving bodies 1 to N current time movement data 501-1 to 501-N are the movement amounts of the moving bodies 1 to N since time t. This movement amount indicates how much each of the moving bodies 1 to N has moved from before time t. The moving bodies 1 to N future time movement data 503-1 to 503-N are the movement amounts of the moving bodies 1 to N at the future time. This movement amount indicates how much each moving body moves by the future time t0, t1, . . . , tT. The moving bodies 1 to N current time movement data 501-1 to 501-N and the moving bodies 1 to N future time movement data 503-1 to 503-N are coordinates based on the position at the current time of each of the moving bodies 1 to N.

The moving bodies 1 to N future time movement data 503-1 to 503-N are used to predict in which direction the moving bodies 1 to N are likely to move, and are not accurate prediction information. Therefore, it is not used as a result of behavior prediction.

The moving bodies 1 to N future time movement data 503-1 to 503-N are used for learning the recurrent neural networks 502-1 to 502-N more easily. When learning the recurrent neural networks 502-1 to 502-N, the movement amounts at the future times t0, t1, . . . , tT of the moving bodies 1 to N can be given as teacher information from the moving bodies 1 to N future time movement data 503-1 to 503-N.

The totally coupled layers 505-1 to 505-N receive the moving bodies 1 to N current time relative position data 504-1 to 504-N, and output a result obtained by applying an affine transformation and an activation function. The moving bodies 1 to N current time relative position data 504-1 to 504-N indicate the relative positions of the moving bodies 1 to N in a coordinate system centered on the own vehicle position at the current time. The outputs of the totally coupled layers 505-1 to 505-N have the same dimensions as the internal states of the recurrent neural networks 502-1 to 502-N.

The multiplication layers 506-1 to 506-N output the products of the internal states of the recurrent neural networks 502-1 to 502-N and the outputs of the totally coupled layers 505-1 to 505-N for each element. The movement amount of each of the moving bodies 1 to N predicted at the future time by the recurrent neural networks 502-1 to 502-N is performed in a coordinate system centering on the current time of each of the moving bodies 1 to N. Therefore, the relative position of to each of the moving bodies 1 to N with respect to the own vehicle 101 is multiplied by the value processed by the totally coupled layer 505-1 to 505-N for each element, so that the relative movement amount to the own vehicle 101 can be calculated.

The summation layer 507 calculates the summation of the outputs of the multiplication layers 506-1 to 506-N of the moving bodies 1 to N. The summation layer 507 takes the sum of the values of the multiplication layers 506-1 to 506-N of each of the moving bodies 1 to N, so that it is possible to grasp whether the moving bodies 1 to N which are going to move from the own vehicle 101 to which relative position and in which direction.

When the sum of the outputs of the multiplication layers 506-1 to 506-N of all the recognized moving bodies 1 to N is taken by the summation layer 507, the prediction is performed in consideration of the interaction between each of the moving bodies 1 to N and the road information by the convolutional neural network. The map data 508 is data in which road information around the own vehicle 101 is stored.

At this time, a convolution layer 509 applies a convolutional neural network to the map data 508. The coupled layer 510 couples the output of convolution layer 509 and the output of the summation layer 507.

The output of the convolution layer 509 and the output of the summation layer 507 can be combined by, for example, adding the output of the summation layer 507 to the width and height of the convolution layer 509 in the channel direction of the output result of the convolution layer 509. Further, an additional neural network such as a convolution layer may be added between the summation layer 507 and the coupled layer 510.

A convolution layer 511 applies a convolutional neural network to the combined result of the output of the summation layer 507 and the output of the convolution layer 509, and outputs future time behavior data 512. The future time behavior data 512 represents the probability that the moving bodies 1 to N exist at the coordinates at future times t0, t1, . . . , tT on the coordinate system around the own vehicle 101. The future time behavior data 512 has the same format as the map information 313 illustrated in FIG. 4.

The convolution layers 509 and 511 do not necessarily have to be a single layer, and may be a plurality of layers, and the map data 508, the convolution layers 509 and 511, and the coupled layer 510 may keep each intermediate state and the width and height of the output constant through the future time behavior data 512, or may be reduced or enlarged. In the above-described embodiment, the configuration in a situation where N moving bodies 1 to N are present has been described. However, the number of moving bodies is not limited, and only one or more moving bodies are required.

Through the above processing, the first prediction behavior 204 and a second prediction behavior 208 are output from the first behavior prediction unit 203 and the second behavior prediction unit 207 in FIG. 2. The first prediction behavior 204 is input to the prediction error calculation unit 205, the control unit 209, and the display unit 30. The second prediction behavior 208 is input to the control unit 209 and the display unit 30.

The prediction error calculation unit 205 calculates a prediction error of the first prediction behavior 204 output from the first behavior prediction unit 203. Here, the first prediction behavior 204 at future times t0, t1, . . . , tT expressed in a coordinate system around the own vehicle 101 and a prediction error from the object position recognized by the recognition unit 202 after the future times t0, t1, . . . , tT are obtained. At this time, the object positions recognized by the recognition unit 202 at future times t0, t1, . . . , tT are converted into the same format as the map information 313 illustrated in FIG. 4 similarly to the first prediction behavior 204. On the map information 313, conversion is performed so that if an object exists on a specific grid at a future time t0, t1, . . . , tT, it becomes 1, and if not, 0. The prediction error can be calculated by the mutual entropy of the first prediction behavior 204 and the one obtained by converting the recognition result at the future times t0, t1, . . . , tT into a map expression.

The first parameter update amount calculation unit 206 can calculate the amount of updating the parameter of the first behavior prediction unit 203 so as to minimize the prediction error calculated by the prediction error calculation unit 205. The update amount of this parameter can be determined by a stochastic gradient descent method. The parameters of the first behavior prediction unit 203 are weight matrices and bias terms included in the recurrent neural networks 502-1 to 502-N, the totally coupled layers 505-1 to 505-N, and the convolution layers 509 and 511.

The control unit 209 controls the own vehicle 101 based on the first prediction behavior 204 and the second prediction behavior 208. The control unit 209 determines the trajectory of the own vehicle 101, and controls the steering angle and the speed of the own vehicle 101 so as to follow the determined trajectory. The trajectory is a set of target positions of the own vehicle 101 at certain future times t0, t1, . . . , tT.

Figure 6:
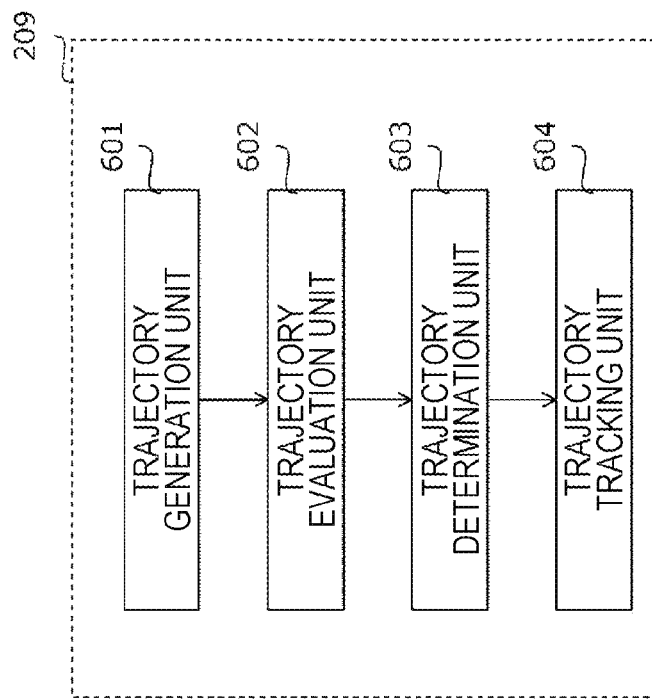
FIG. 6 is a block diagram illustrating a configuration of a control unit in FIG. 2.

FIG. 6 is a block diagram illustrating a configuration of the control unit in FIG. 2.

In FIG. 6, the control unit 209 includes a trajectory generation unit 601, a trajectory evaluation unit 602, a trajectory determination unit 603, and a trajectory tracking unit 604.

The trajectory generation unit 601 generates a plurality of trajectory candidates for the own vehicle 101. The trajectory candidates can be, for example, a plurality of random trajectories.

The trajectory evaluation unit 602 evaluates a plurality of trajectories generated by the trajectory generation unit 601. A trajectory can be evaluated well when the first prediction behavior 204 and the second prediction behavior 208, and the spatial overlap of the generated own vehicle trajectory at future times t0, t1, . . . , tT are small. In addition, the evaluation of the trajectory may be performed simultaneously with the evaluation based on the speed and acceleration of the own vehicle 101 without depending on the first prediction behavior 204 and the second prediction behavior 208, but includes items for evaluating the predicted behaviors of at least the moving bodies 1 to N.

The trajectory determination unit 603 determines the trajectory with the lowest evaluation value of the trajectory evaluation unit 602 as the trajectory that the own vehicle 101 should follow. Further, the trajectory determination unit 603 can determine the trajectory to be followed by the own vehicle 101 in synchronization with the control cycle of the control unit 209.

The trajectory tracking unit 604 controls the steering angle and speed of the own vehicle 101 so as to follow the own vehicle trajectory determined by the automatic determination unit 603.

The driving evaluation unit 210 evaluates driving based on the control result of the own vehicle 101 by the control unit 209. In this driving evaluation, it is determined whether the own vehicle 101 has performed unsafe driving such as sudden braking, sudden steering, sudden acceleration, and sudden deceleration. Unsafe driving can be determined based on whether a driving support function such as a collision avoidance function of the own vehicle 101 has operated, whether the steering angle and the speed have changed by a threshold value or more. In addition, in this evaluation, it is possible to determine whether the own vehicle 101 has performed an inoperative operation in which the own vehicle 101 does not move despite the fact that the moving bodies 1 to N do not exist around the own vehicle 101 and the own vehicle 101 can safely travel.

The reward generation unit 211 generates a reward based on the driving evaluation result by the driving evaluation unit 210. At this time, in a case where the driving evaluation unit 210 determines that the unsafe driving or the inoperative driving has occurred, a negative reward may be generated, and in a case where it is determined that neither the unsafe driving nor the inoperative driving has occurred, the positive reward may be generated.

The second parameter update amount calculation unit 212 calculates an update amount of the parameter of the second behavior prediction unit 207 so that the reward generated by the reward generation unit 211 can be obtained more. This update amount can be calculated by a stochastic gradient descent method or an evolutionary algorithm. At this time, the second behavior prediction unit 207 can update parameters such that the unsafe driving and the inoperative driving of the own vehicle 101 do not occur as a result of actually controlling the own vehicle 101 based on the first prediction behavior 204 and the second prediction behavior 208.

Since the first behavior prediction unit 203 is learned by supervised learning, the first prediction behavior 204 strongly memorizes the frequent pattern. In a case where the control unit 209 controls the own vehicle 101 based on the first prediction behavior 204 that strongly remembers the frequent pattern, the own vehicle 101 can safely drive if the moving bodies 1 to N around the own vehicle 101 behave according to the frequent pattern even if the second prediction behavior 208 does not predict anything.

In a case where the moving bodies 1 to N around the own vehicle 101 do not act according to the frequent pattern, that is, in a case where the rare pattern occurs, an unsafe event occurs, and the own vehicle 101 drives unsafely if the second behavior prediction unit 207 does not predict anything. Since the second behavior prediction unit 207 is learned to avoid such unsafe driving, it comes to predict the rare pattern that leads to unsafe driving.

In addition, by learning the second behavior prediction unit 207 so that the inoperative driving does not occur, it is possible to prevent a situation in which the surroundings of the own vehicle 101 are dangerous and the own vehicle 101 cannot be moved. At this time, the first behavior prediction unit 203 can perform optimistic behavior prediction, and the second behavior prediction unit 207 can perform careful behavior prediction.

In addition, the second behavior prediction unit 207 predicts a behavior that leads to unsafe driving in the same format as the map information 313 illustrated in FIG. 4. For this reason, there is a possibility that unsafe driving may be induced even in an area where the moving bodies 1 to N do not exist around the own vehicle 101, even an area where the moving bodies 1 to N may suddenly occur due to jumping out such as at an intersection is not affected, and it is possible to predict the behavior of the appearance of the moving bodies 1 to N.

Further, the reward generation unit 211 may update the reward in synchronization with the control cycle of the control unit 209, may update the reward for each section of the driving route, or may combine these. The section of the driving route can be, for example, a left turn, a right turn, a straight line to an intersection, or a departure point to a destination on a map used for navigation. In a case where the control cycle of the control unit 209 and the section of the driving route are combined, these may be treated equally or any one of them may be weighted. The first behavior prediction unit 203 and the second behavior prediction unit 207 can update the first prediction behavior 204 and the second prediction behavior 208 in synchronization with the reward update period of the reward generation unit 211.

Figure 7:
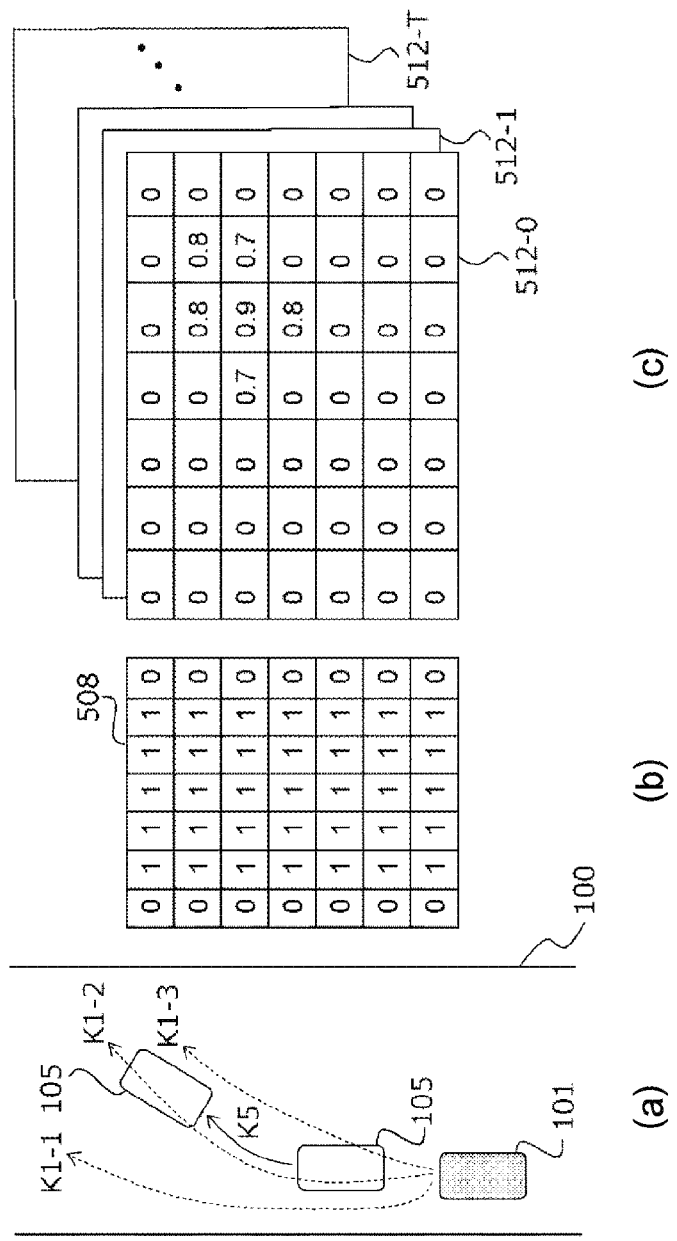
FIG. 7($a$) is a schematic diagram illustrating an evaluation method of a driving evaluation unit in FIG. 2, FIG. 7($b$) is a diagram illustrating an example of a data map in FIG. 5, and FIG. 7($c$) is a diagram illustrating an example of future time behavior data of FIG. 5.

FIG. 7(a) is a schematic diagram illustrating an evaluation method of the driving evaluation unit of FIG. 2, FIG. 7(b) is a diagram illustrating an example of the data map in FIG. 5, and FIG. 7(c) is a diagram illustrating an example of future time behavior data of FIG. 5.

In FIG. 7(a), it is assumed that the own vehicle 101 is driving on the road 100 and the other vehicle 105 is driving in front of the own vehicle 101. It is assumed that the other vehicle 105 moves along the route K5. The other vehicle 105 corresponds to the moving body 1 in FIG. 5.

The road 100 is recognized by the recognition unit 202 provided in the own vehicle 101, and map data 508 is created. It is assumed that 1 is stored in each cell of the map data 508 corresponding to the position of the road 100 in FIG. 7(a), and 0 is stored in correspondence with a position other than the road 100.

The moving body 1 current time movement data 501-1, the moving body 1 current time relative position data 504-1, and the map data 508 of the other vehicle 105 are input to the behavior prediction unit in FIG. 5. Then, as an output of this behavior prediction unit, as illustrated in FIG. 7(c), future time behavior data 512-0, 512-1, ..., 512-T at future times t0, t1, ..., tT are obtained. Each cell of the future time behavior data 512-0, 512-1, ..., 512-T stores the probability that the other vehicle 105 exists at each coordinate at future times t0, t1, ..., tT.

The control unit 209 of FIG. 2 controls the own vehicle 101 based on the future time behavior data 512-0, 512-1, ..., 512-T of the other vehicle 105. Here, it is assumed that the trajectory generation unit 601 has generated trajectory candidates K1-1, K1-2, and K1-3 of the own vehicle 101. Then, the trajectory evaluation unit 602 evaluates the spatial overlap of each of the trajectory candidates K1-1, K1-2, and K1-3 with the other vehicle 105 at future times t0, t1, ..., tT. At this time, for example, in the trajectory candidate K1-1, the spatial overlap is 0%, in the trajectory candidate K1-2, the spatial overlap is 80%, and in the trajectory candidate K1-3, the spatial overlap is 30%. In this case, the trajectory determination unit 603 determines the trajectory candidate K1-1 having the smallest spatial overlap as the trajectory to be followed by the own vehicle 101. Then, the trajectory tracking unit 604 controls the steering angle and speed of the own vehicle 101 so as to follow the trajectory candidate K1-1 determined as the own vehicle trajectory.

It is assumed that as a result of controlling the steering angle and speed of the own vehicle 101 to follow the trajectory candidate K1-1, sudden braking and sudden steering of the own vehicle 101 have occurred. At this time, the driving evaluation unit 210 determines that the driving is unsafe, and the reward generation unit 211 generates a negative reward. Here, the second parameter update amount calculation unit 212 calculates the update amount of the parameter of the second behavior prediction unit 207 so that more rewards generated by the reward generation unit 211 can be obtained. Therefore, the second parameter update amount calculation unit 212 calculates the update amount of the parameter of the second behavior prediction unit 207 so that a negative reward is not generated. As a result, the second behavior prediction unit 207 can generate the second prediction behavior 208 so that the driving evaluation unit 210 does not determine that the driving is unsafe.

Figure 8:
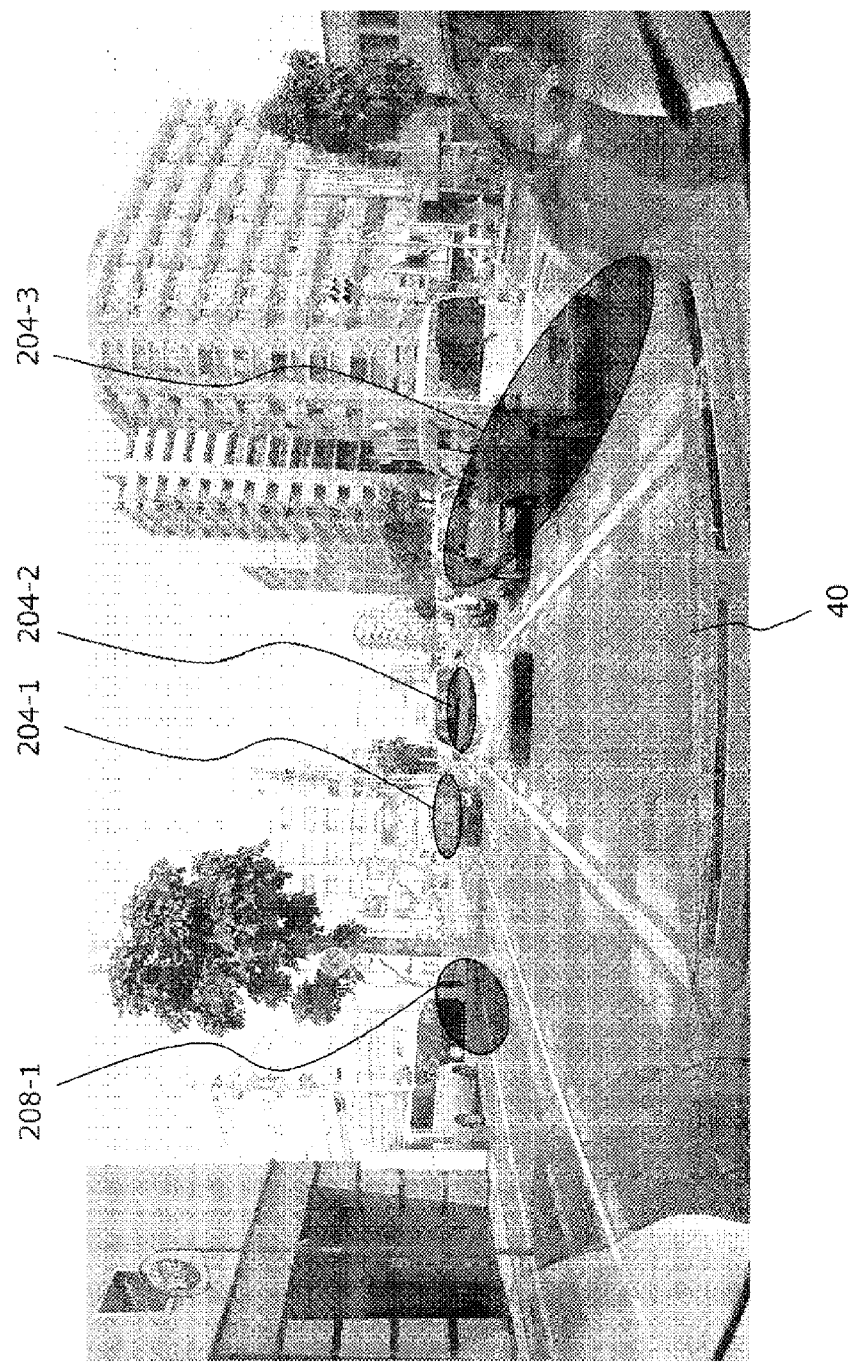
FIG. 8 is a diagram illustrating a display example of a first prediction behavior and a second prediction behavior predicted by the moving body behavior prediction device of FIG. 2.

FIG. 8 is a diagram illustrating a display example of a first prediction behavior and a second prediction behavior predicted by the moving body behavior prediction device of FIG. 2.

In FIG. 8, first prediction behaviors 204-1 to 204-3 and a second prediction behavior 208-1 are projected on a windshield 40 of the own vehicle 101. The first prediction behaviors 204-1 to 204-3 and the second prediction behavior 208-1 can be displayed at positions of the moving body that can be actually observed by the driver through the windshield 40.

This allows the driver to recognize the first prediction behaviors 204-1 to 204-3 and the second prediction behavior 208-1 without distracting the driver from the front while driving.

In the above-described first embodiment, the configuration in which the first prediction behavior 204 and the second prediction behavior 208 are both used by the control unit 209 has been described.

Hereinafter, a method of selecting the predicted behavior used by control unit 209 according to the surrounding environment will be described.

Second Embodiment

Figure 9:
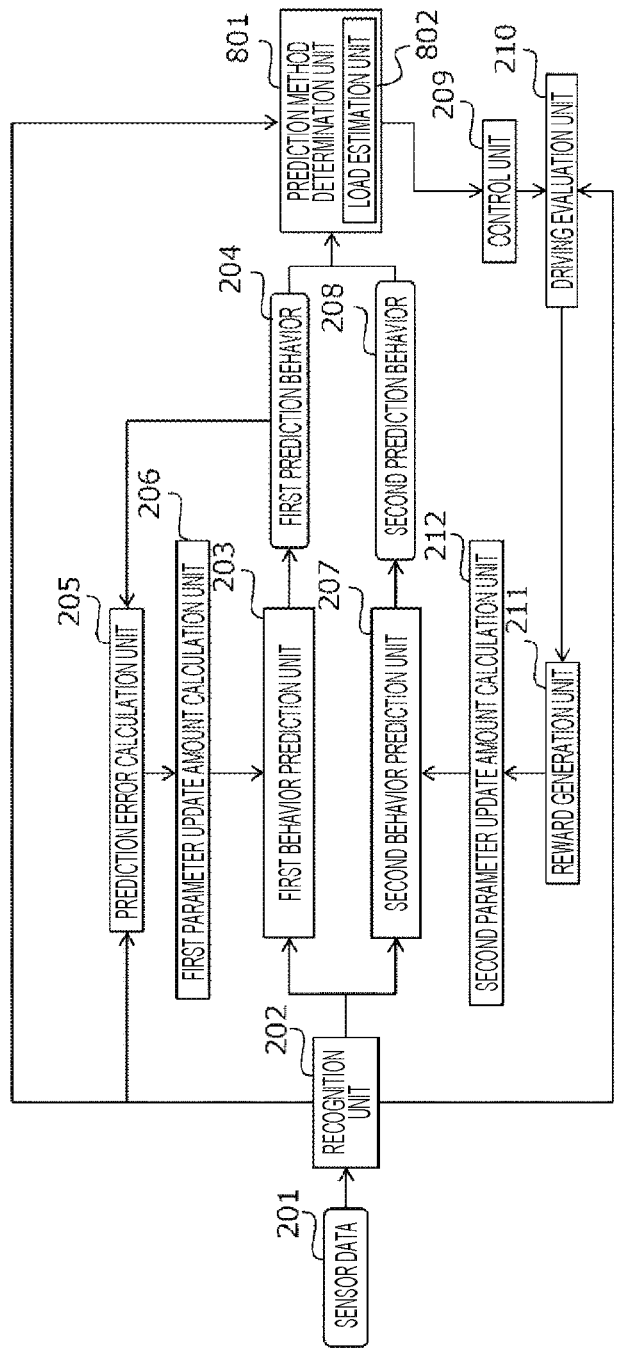
FIG. 9 is a block diagram illustrating a configuration of a moving body behavior prediction device according to a second embodiment.

FIG. 9 is a block diagram illustrating a configuration of the moving body behavior prediction device according to the second embodiment. In the moving body behavior prediction device of FIG. 9, a prediction method determination unit 801 is added to the moving body behavior prediction device of FIG. 2. The prediction method determination unit 801 includes a weight estimation unit 802.

The prediction method determination unit 801 determines the predicted behavior used by the control unit 209 according to the surrounding environment information acquired by the recognition unit 202, as any one of the first prediction behavior 204 only, the second prediction behavior 208 only, and a weighted average of the first prediction behavior 204 and the second prediction behavior 208. In addition, in a case where the weighted average of the first prediction behavior 204 and the second prediction behavior 208 is selected, the weight estimation unit 802 estimates the weight used for the weighted average.

The determination of the prediction method is performed by supervised learning. The prediction method determination unit 801 stores the own vehicle trajectory generated by the control unit 209 using only the first prediction behavior 204 and the own vehicle trajectory generated by the control unit 209 using only the second prediction behavior 208 in association with the information of the recognition unit 202 at the same time. After that, at the future time, the driving evaluation unit 210 determines whether both the own vehicle trajectory based on only the first prediction behavior 204 and the own vehicle trajectory based on only the second prediction behavior 208 do not cause unsafe driving and inoperative driving.

The prediction method determination unit 801 has a prediction model based on machine learning that has two outputs, about whether the own vehicle trajectory based on only the first prediction behavior 204 with the information of the recognition unit 202 as an input causes unsafe driving and inoperative driving, and about whether the own vehicle trajectory based on only the second prediction behavior 208 causes unsafe driving and inoperative driving. The prediction model is learned as a two-class classification problem in a case where the own vehicle trajectory based on only the respective predicted behaviors causes unsafe driving and inoperative driving is a negative example, and a case where the driving is not caused is a positive example.

At the time of actual driving, the prediction method determination unit 801 uses the information acquired from the recognition unit 202 to predict whether the own vehicle trajectory using only the first prediction behavior 204 and the own vehicle trajectory using only the second prediction behavior 208 cause unsafe driving and inoperative driving, and outputs a certainty factor which is a positive example. The certainty factor that the own vehicle trajectory using only the first prediction behavior 204 does not cause unsafe driving and inoperative driving is P1, and the certainty factor that the own vehicle trajectory using only the second prediction behavior 208 causes unsafe driving and inactive driving is P2.

If the certainty factor P1 is larger than a threshold value TH and the certainty factor P2 is smaller than a threshold value TL, the prediction method determination unit 801 determines that the control unit 209 uses only the first prediction behavior 204. If the certainty factor P1 is smaller than the threshold value TL and the certainty factor P2 is larger than the threshold value TH, the prediction method determination unit 801 determines that the control unit 209 uses only the second prediction behavior 208.

In other cases, the first prediction behavior 204 and the second prediction behavior 208 are weighted at a ratio of $P1/(P1+P2):P2/(P1+P2)$, and the value obtained by taking the weighted average is used by the control unit 209. The threshold values TH and TL are values determined in advance.

At this time, in addition to the information illustrated in FIG. 3, the recognition unit 202 may add to the input GPS information, surrounding map information, and the road type of the driving road.

Here, by selecting the predicted behavior used by the control unit 209 according to the surrounding environment, the first prediction behavior 204 and the second prediction behavior 208 can be predicted based on the certainty factor that the own vehicle trajectory does not cause unsafe driving and inoperative driving. The prediction accuracy of the first prediction behavior 204 and the second prediction behavior 208 can be improved.

Third Embodiment

Figure 10:
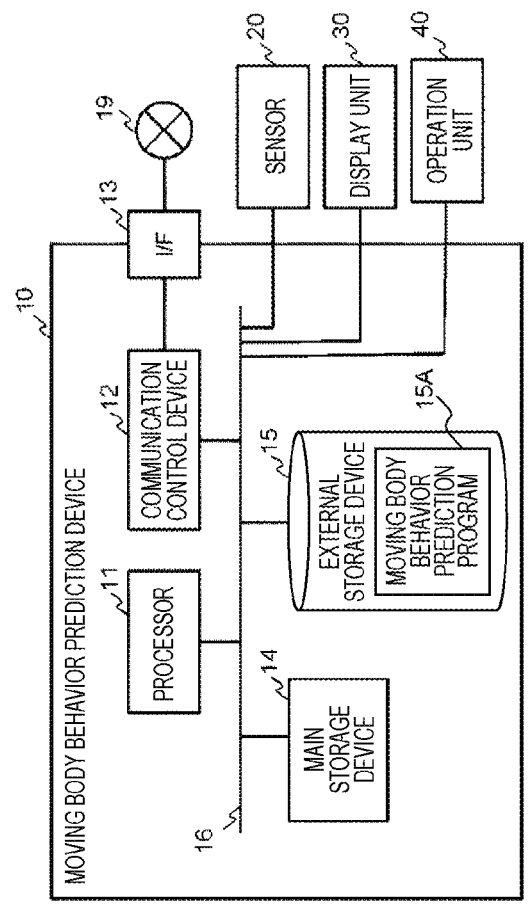
FIG. 10 is a block diagram illustrating a hardware configuration of a moving body behavior prediction device according to a third embodiment.

FIG. 10 is a block diagram illustrating a hardware configuration of a moving body behavior prediction device according to a third embodiment.

In FIG. 10, the moving body behavior prediction device 10 includes a processor 11, a communication control device 12, a communication interface 13, a main storage device 14, and an external storage device 15. The processor 11, the communication control device 12, the communication interface 13, the main storage device 14, and the external storage device 15 are interconnected via an internal bus 16. The main storage device 14 and the external storage device 15 are accessible from the processor 11.

In addition, the sensor 20, the display unit 30, and an operation unit 40 are provided as an input/output interface of the moving body behavior prediction device 10. The sensor 20, the display unit 30, and the operation unit are connected to the internal bus 16. The operation unit 40 performs acceleration, deceleration, braking, steering, and the like of the own vehicle 101 by operating the engine, transmission, brake, steering, and the like of the own vehicle 101 based on a command from the control unit 209 in FIG. 2.

The processor 11 is hardware that controls the operation of the entire moving body behavior prediction device 10. The main storage device 14 can be configured by, for example, a semiconductor memory such as an SRAM or a DRAM. The main storage device 14 can store a program being executed by the processor 11 or provide a work area for the processor 11 to execute the program.

The external storage device 15 is a storage device having a large storage capacity, for example, a hard disk device or an SSD (Solid State Drive). The external storage device 15 can hold executable files of various programs. The external storage device 15 can store a moving body behavior prediction program 15A. The processor 11 reads the moving body behavior prediction program 15A into the main storage device 14 and executes the moving body behavior prediction program 15A, whereby the functions of the moving body behavior prediction device 10 in FIG. 1 can be realized.

The communication control device 12 is hardware having a function of controlling communication with the outside. The communication control device 12 is connected to a network 19 via the communication interface 13.

As described above, the embodiments of the invention have been described. However, the mounting location of each function described in this embodiment does not matter. In other words, it may be mounted on a vehicle or on a data center that can communicate with the vehicle.

In addition, in the above-described embodiment, a case has been described in which the moving body behavior prediction device is used for operating a vehicle. However, the moving body behavior prediction device may be used for other than vehicles, for example, for flying objects such as drones and unmanned vehicles. It may be used for flight control or for walking control and posture control of a robot equipped with artificial intelligence.

Further, the invention is not limited to the above-described embodiments, but various modifications may be contained. The above-described embodiments have been described in detail for clear understating of the invention, and are not necessarily limited to those having all the described configurations. In addition, some of the configurations of a certain embodiment may be replaced with the configurations of the other embodiments, and the configurations of the other embodiments may be added to the configurations of a certain embodiment. In addition, some of the configurations of each embodiment may be omitted, replaced with other configurations, and added to other configurations.

REFERENCE SIGNS LIST 10 moving body behavior prediction device
20 sensor
101 own vehicle
102, 103 other vehicles
104 pedestrian

The invention claimed is:

1. A moving body behavior prediction device, comprising:
a processor configured to:
output a first prediction behavior of a moving body based on a prediction result of a behavior of the moving body recognizable from a vehicle and a recognition result of the behavior of the moving body after a prediction time elapses; and
output a second prediction behavior of the moving body recognizable from the vehicle based on a behavior of the vehicle.

2. The moving body behavior prediction device according to claim 1,
wherein the processor includes a first neural network that outputs the first prediction behavior based on supervised learning, and
wherein the processor includes a second neural network that outputs the second prediction behavior based on reinforcement learning.

3. The moving body behavior prediction device according to claim 1,
wherein the first prediction behavior and the second prediction behavior are used for driving control of the vehicle,
wherein the processor learns the first prediction behavior so as to minimize an error between the prediction result of the behavior of the moving body and the recognition result of the behavior of the moving body after the prediction time elapses, and
wherein the processor learns the second prediction behavior of the moving body recognizable from the vehicle so that the vehicle does not perform one or more particular driving operations.

4. The moving body behavior prediction device according to claim 3, wherein the processor is further configured to:
recognize a type, position, and speed of the moving body;
control the vehicle based on at least one of the first prediction behavior and the second prediction behavior;
evaluate driving safety of the vehicle based on a control result of the vehicle; and
generate a negative reward if a safety evaluation result is unsafe, and generate a positive reward if the safety evaluation result is safe,
wherein a prediction parameter is updated so as to maximize the reward.

5. The moving body behavior prediction device according to claim 4,
wherein the processor is further configured to:
generate a parallax image based on a plurality of camera images,
recognize an object based on the plurality of camera images and output a recognition result of the object,
calculate a first position recognition result at a current time of the object based on the parallax image and the recognition result of the object, and
predict a second position recognition result of the object at a current time based on a trajectory of the vehicle and the second position recognition result up to a previous time, and track the object based on a matching result between the first position recognition result and the second position recognition result.

6. The moving body behavior prediction device according to claim 4,
wherein the processor includes:
N recurrent neural networks that, based on movement data of a current time of N (N is a positive integer) moving bodies, output movement data at a future time of the N moving bodies, respectively,
N totally coupled layers that each apply an affine transformation and an activation function to relative position data of the N moving bodies based on the position of the vehicle,
N multiplication layers that each multiply internal states of the N recurrent neural networks and outputs of the N totally coupled layers, respectively,
a summation layer that sums outputs of the N multiplication layers, a first convolution layer that applies a first convolutional neural network to road information around the vehicle, a coupled layer that couples an output of the summation layer and an output of the first convolution layer, and a second convolution layer that applies a second convolutional neural network to an output of the coupled layer.

7. The moving body behavior prediction device according to claim 4, wherein the processor is configured to:

generate a plurality of trajectory candidates for the vehicle, evaluate the plurality of trajectory candidates based on the first prediction behavior and the second prediction behavior, determine a trajectory of the vehicle based on an evaluation result of the plurality of trajectory candidates, and control the vehicle so that the vehicle follows the trajectory determined based on the evaluation result.

8. The moving body behavior prediction device according to claim 4, wherein the processor is further configured to:

determine, based on a certainty factor about whether the vehicle causes unsafe driving or inoperative driving, a predicted behavior used to control the vehicle as any one of the first prediction behavior only, the second prediction behavior only, and a weighted average of the first prediction behavior and the second prediction behavior.

9. The moving body behavior prediction device according to claim 4, wherein the processor is further configured to:

estimate a weight of the first prediction behavior and a weight of the second prediction behavior, control the vehicle based on a weighted average of the first prediction behavior and the second prediction behavior.

10. The moving body behavior prediction device according to claim 4, further comprising:

a display unit that displays the first prediction behavior and the second prediction behavior together with a camera image in front of the vehicle in a superimposed manner.

11. The moving body behavior prediction device according to claim 4, further comprising:

a display unit that displays the first prediction behavior and the second prediction behavior on a windshield of the vehicle.

12. A moving body behavior prediction method for controlling a vehicle, comprising:

predicting a first behavior of a moving body based on supervised learning;

predicting a second behavior of the moving body based on reinforcement learning; and controlling the vehicle based on at least one of the first behavior of the moving body or the second behavior of the moving body;

wherein a frequency of appearance of the second behavior at the time of the prediction is smaller than a frequency of appearance of the first behavior.

* * * * *